United States Patent
Zhao et al.

(10) Patent No.: US 11,652,414 B2
(45) Date of Patent: May 16, 2023

(54) MIXED ANALOG-TO-DIGITAL CONVERTER CIRCUIT

(71) Applicant: Teng Long, Beijing (CN)

(72) Inventors: Hui Zhao, Huanggang (CN); Yanfeng Shen, Huanggang (CN); Teng Long, Beijing (CN)

(73) Assignee: Teng Long, Beijing (CN)

( * ) Notice: Subject to any disclaimer, the term of this patent is extended or adjusted under 35 U.S.C. 154(b) by 0 days.

(21) Appl. No.: 17/201,334

(22) Filed: Mar. 15, 2021

(65) Prior Publication Data
US 2021/0376726 A1    Dec. 2, 2021

(30) Foreign Application Priority Data

Jan. 15, 2020    (CN) .......................... 202020082105.7

(51) Int. Cl.
  *H02M 3/158*    (2006.01)
  *H02M 1/14*     (2006.01)
  *H02M 1/00*     (2006.01)
  *H02M 1/15*     (2006.01)
  *H02M 1/44*     (2007.01)
  *H02M 3/156*    (2006.01)

(52) U.S. Cl.
  CPC ............. *H02M 3/158* (2013.01); *H02M 1/14* (2013.01); *H02M 1/0003* (2021.05); *H02M 1/15* (2013.01); *H02M 1/44* (2013.01); *H02M 3/156* (2013.01)

(58) Field of Classification Search
  None
  See application file for complete search history.

(56) References Cited

U.S. PATENT DOCUMENTS

| | | | | |
|---|---|---|---|---|
| 6,118,400 A | * | 9/2000 | Susak | H03M 1/78 341/172 |
| 6,400,302 B1 | * | 6/2002 | Amazeen | H03M 1/68 341/172 |
| 7,733,261 B2 | * | 6/2010 | Bhakta | H02M 3/157 341/120 |
| 2010/0321220 A1 | * | 12/2010 | Ginetti | H03M 1/442 341/143 |

FOREIGN PATENT DOCUMENTS

CN    110708067    *    1/2020    .............. H03M 1/68

* cited by examiner

*Primary Examiner* — Matthew V Nguyen
(74) *Attorney, Agent, or Firm* — Oliff PLC

(57) ABSTRACT

A mixed analog-to-digital converter circuit capable of stabilizing voltages at two ends of a load and reducing output voltage ripples, includes a power supply, a digital converter, an analog converter, and a load assembly. The analog converter includes power supply capacitors arranged in parallel; and when working, the load assembly is connected to corresponding power supply capacitors, and the power supply capacitors not connected to the load assembly are connected to the digital converter. The digital converter includes a component multiplexer connected to input and output ends of a power supply through wires; the component multiplexer includes power supply capacitors arranged in series; the analog converter includes the component multiplexer; two ends of each power supply capacitor in the component multiplexer are respectively connected to input and output ends of the load assembly through discharge wires; and when working, the load assembly is connected to corresponding power supply capacitors.

11 Claims, 4 Drawing Sheets

MIXED ANALOG-TO-DIGITAL CONVERTER CIRCUIT

BACKGROUND

Technical Field

The utility model relates to a mixed analog-to-digital converter circuit.

Related Art

DC/DC converters can be divided into the linear-mode and the switch-mode. The existing linear mode converter suffers low conversion efficiency, severe thermal issue, and low power density, therefore, the switch-mode power supply dominates the market of high power DC/DC conversion. The conventional switch-mode power supply is based on a digital converter and uses semiconductors as switches to control the power flow. However, the switching actions generate square voltage/current waveforms, which cause severe instantaneous power fluctuations, and thus require bulk low-pass filters to filter ripples.

At present, there are mainly three methods to solve the problem of the oversize low-pass filter:

The first method is to reduce the sizes of ripples from a power supply. Multi-level converters are generally used for reducing the sizes of ripples of the power supply. However, multi-level converters require a large number of semiconductors, and in order to maintain the power balance between sub-modules, additional sensing circuits and complex control methods are required.

The second method is to increase the gain of the low-pass filter in the transmission process. By increasing the switch frequency, the filtering effect of the specific low-pass filter can be increased. However, increasing the switch frequency may increase the power loss in the semiconductor and magnetic units. In addition, parasitic elements such as capacitors, resistors, and inductors may reduce the filtering effect of filters at high frequencies.

The third method is to use an advanced control method, such as an active capacitance method. This method can transfer the ripple power to an energy storage device, thereby reducing the ripple power delivered to a load. However, according to Shannon's sampling theorem, a control bandwidth of the existing DC/DC converter is limited by the switch frequency, but the frequency of a main component of a switch ripple is equal to or greater than the switch frequency. Therefore, the existing active control method cannot reduce switch harmonics.

SUMMARY

The technical problem to be solved by the utility model is to provide a mixed analog-to-digital converter circuit capable of stabilizing voltages at two ends of a load, reducing output voltage ripples, and increasing the power density of a transformer.

To solve the technical problem above, the technical solution adopted in the utility model is a mixed analog-to-digital converter circuit, including a power supply and a digital converter connected to the power supply. An analog converter is connected between an input end and an output end of the digital converter, and the analog converter is connected to a load assembly.

The analog converter includes a plurality of power supply capacitors; two ends of each power supply capacitor are respectively connected to the input end and the output end of the digital converter through charge wires, and at least one of the charge wires is equipped with a charge switch; two ends of each power supply capacitor are respectively connected to an input end and an output end of the load assembly through discharge wires, and at least one of the discharge wires is equipped with a discharge switch; when working, the load assembly is connected to corresponding power supply capacitors in turn by closing the corresponding discharge switch; and the power supply capacitors which are not connected to the load assembly are connected to the digital converter in turn by closing the corresponding charge switch.

As a preferred solution, the load assembly is equivalent to a load capacitor $C_L$ and a load resistor $R_L$ arranged in parallel, and a load inductor L connected in series to the load capacitor $C_L$ and the load resistor $R_L$ arranged in parallel;

when an equivalent capacitance $C_L$ of the load assembly portion is given, minimum capacitance values $C_1, C_2, \ldots C_N$ of the power supply capacitors are equal to a DC bus capacitance value $C_{bus}$, which is calculated according to the following formula:

$$C_{bus} = \frac{2I_o}{9\sqrt{3}\, L_2 \Delta V_o N^3 f_{sw}^3 C_L},$$

where $I_o$ is an output current on an equivalent resistance $R_L$ of the load assembly portion; $V_o$ is an output voltage on the equivalent resistance $R_L$ of the load assembly portion; $\Delta V_o$ is an output voltage ripple on the equivalent resistance $R_L$ of the load assembly portion; $f_{sw}$ is a circuit switch frequency; and L is an equivalent inductance of the load assembly; and when the equivalent capacitance $C_L$ of the load assembly portion is not limited, the minimum capacitance values $C_1, C_2, \ldots C_N$ of the power supply capacitors are equal to the DC bus capacitance value $C_{bus}$, which is calculated according to the following formula:

$$C_{bus} = \sqrt{\frac{2I_o}{9\sqrt{3}\, L_2 \Delta V_o N^4 f_{sw}^3}},$$

and if $NC_{bus}=C_L$, the required minimum $C_L$ is obtained:

$$C_L = \sqrt{\frac{2I_o}{9\sqrt{3}\, L_2 \Delta V_o N^2 f_{sw}^3}},$$

where N is the number of power supply capacitors; $I_o$ is an output current on the equivalent resistance $R_L$ of the load assembly portion; $V_o$ is an output voltage on the equivalent resistance $R_L$ of the load assembly portion; $\Delta V_o$ is an output voltage ripple on the equivalent resistance $R_L$ of the load assembly portion; $f_{sw}$ is a circuit switch frequency; and L is an equivalent inductance of the load assembly.

As a preferred solution, the digital converter is a DC/DC converter.

As a preferred solution, the digital converter is a buck converter, or a boost converter, or a resonant converter.

As a preferred solution, the charge time and discharge time of each power supply capacitor are equal to a circuit switch period $T_{sw}$/the number of power supply capacitors N.

Another technical problem to be solved by the utility model is to provide a mixed analog-to-digital converter circuit capable of stabilizing voltages at two ends of a load, reducing output voltage ripples, and increasing the power density of a transformer.

To solve the technical problem above, the technical solution adopted in the utility model is as follows:

A mixed analog-to-digital converter circuit, including a power supply and a digital converter connected to the power supply, where an analog converter is connected between an input end and an output end of the digital converter, and the analog converter is connected to a load assembly;

the digital converter includes a component multiplexer connected to an input end and an output end of the power supply through wires; the component multiplexer includes a plurality of power supply capacitors which are arranged in series; the analog converter includes the component multiplexer, and two ends of each power supply capacitor in the component multiplexer are respectively connected to an input end and an output end of the load assembly through discharge wires, and at least one of the discharge wires is equipped with a discharge switch; and when working, the load assembly is connected to corresponding power supply capacitors in turn by closing the corresponding discharge switch.

As a preferred solution, the load assembly is equivalent to a load capacitor $C_L$ and a load resistor $R_L$ arranged in parallel, and a load inductor L connected in series to the load capacitor $C_L$ and the load resistor $R_L$ arranged in parallel;

when an equivalent capacitance $C_L$ of the load assembly portion is given, minimum capacitance values $C_1, C_2, \ldots C_N$ of the power supply capacitors are equal to a DC bus capacitance value $C_{bus}$, which is calculated according to the following formula:

$$C_{bus} = \frac{(N-1)I_o}{36\sqrt{3}\,N^4 \Delta V_o C_L L f_{sw}^3},$$

where N is the number of power supply capacitors; $I_o$ is the output current; $V_o$ is the output voltage across the load $R_L$; $\Delta V_o$ is an output voltage ripple on the load $R_L$; $f_{sw}$ is the switching frequency; and L is an equivalent inductance of the load assembly; and when the equivalent capacitance $C_L$ of the load assembly portion is not limited, the minimum capacitance values $C_1$, $C_2, \ldots C_N$ of the power supply capacitors are equal to the DC bus capacitance value $C_{bus}$, which is calculated according to the following formula:

$$C_{bus} = \frac{(N-1)I_o}{36\sqrt{3}\,N^4 C_L L f_{sw}^3},$$

and if $NC_{bus}=C_L$, the required minimum $C_L$ is obtained:

$$C_L = \sqrt{\frac{(N-1)I_o}{36\sqrt{3}\,N^3 \Delta V_o L f_{sw}^3}},$$

where N is the number of power supply capacitors; $I_o$ is the output current; $V_o$ is an output voltage across the load $R_L$; $\Delta V_o$ is an output voltage ripple across the load $R_L$; $f_{sw}$ is the switching frequency; and L is the equivalent inductance of the load assembly.

As a preferred solution, the charge time and discharge time of each power supply capacitor are equal to a circuit switch period $T_{sw}$/the number of power supply capacitors N.

Beneficial effects of the utility model are as follows:

In the circuit disclosed by the utility model, the load draws energy from each of the power supply capacitors. Therefore, the voltage at both ends of the load is always maintained between the voltages of the selected capacitors, and can be kept stable, and there is no sudden voltage fluctuations (from 0 to E) in the conventional digital converter.

In addition, a charge loop and a discharge loop are independent loops. Therefore, even if there is no advanced control technology or high bandwidth control, the ripple power may be forcibly transferred to capacitors on the DC bus, instead of being directly supplied to the load.

In this circuit, different types of mixed analog-to-digital converter circuits can be obtained by selecting specific digital converters and the connection mode of the DC bus capacitors, and the most suitable solution can be selected for a specific problem.

The mixed analog-to-digital converter circuit can effectively reduce the ripple voltage on the load, and the greater the switch frequency is, the more obvious the phenomenon is, which in turn can reduce the low-pass filter and increase the power density.

Since the voltage and current of the power supply, and the voltage and current of the load of the mixed analog-to-digital converter circuit including the component multiplexer do not have square waves, the ripple is small, and only a small low-pass filter is required, which can effectively increase the power density, and the current of the power supply is not in a square wave or square wave-like mode, the electromagnetic interference is small, and the maximum current required may decrease.

The circuit described in this patent discloses minimum limit values of L, $C_L$, and $C_{bus}$ that minimize the overall volume of the circuit. If the actual use value is greater than the minimum limit value, the output ripple is smaller and the quality is higher.

Moreover, when $C_L$ is unknown, the goal is to minimize the total volume of the capacitors. The total volume of all capacitors is determined by a total capacitance value (i.e., $NC_{bus}+C_L$), because the product of the two parameters (i.e., $NC_{bus}+C_L$) is constant, so the sum of the parameters (i.e., $NC_{bus}+C_L$) has a minimum value. The minimum value is obtained if and only if the two parameters are equal to each other. Because the total volume of the capacitors is proportional to the total capacitance value of the capacitors (i.e., $NC_{bus}+C_L$), when $NC_{bus}=C_L$, the total volume is the smallest.

DETAILED DESCRIPTION

The following describes specific embodiments of the utility model in detail with reference to accompanying drawings.

Figure 1:
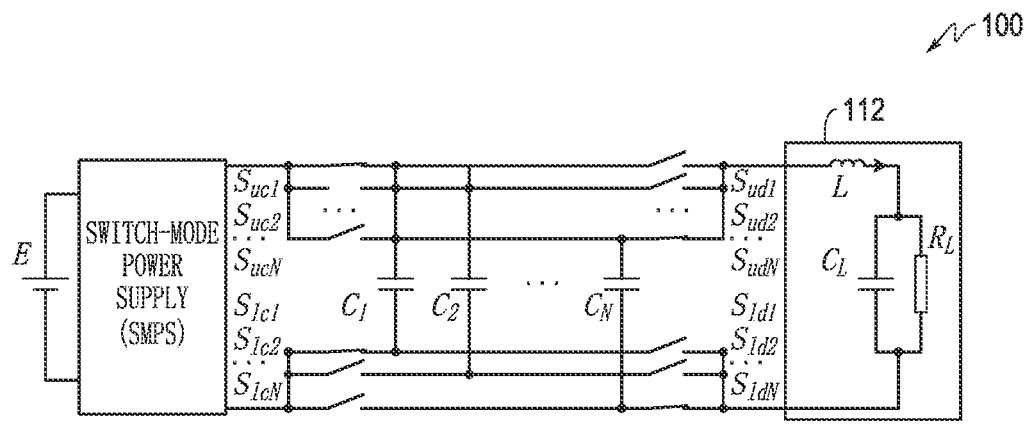
FIG. 1 is a circuit diagram of a mixed analog-to-digital converter circuit according to Embodiment 1 of the utility model.

Embodiment 1 relates to, as shown in FIG. 1, a mixed analog-to-digital converter circuit 100, including a power supply E and a digital converter (SMPS) connected to the power supply E, where an analog converter is connected between an input end and an output end of the digital converter (SMPS), and the analog converter is connected to a load assembly 112;

the analog converter includes a plurality of power supply capacitors C1, C2, ... CN; two ends of each power supply capacitor C1, C2, ... CN are respectively connected to the input end and the output end of the digital converter (SMPS) through charge wires, and two charge wires are equipped with charge switches $S_{uc1}$ ... $S_{ucN}$; two ends of each power supply capacitor are respectively connected to an input end and an output end of the load assembly 112 through discharge wires, and two discharge wires are equipped with discharge switches $S_{ud1}$ ... $S_{udN}$; when working, the load assembly 112 is connected to corresponding power supply capacitors in turn by closing the corresponding discharge switch; and the power supply capacitors which are not connected to the load assembly 112 are connected to the digital converter in turn by closing the corresponding charge switch. The charge time and discharge time of each power supply capacitor are equal to a circuit switch period $T_{sw}$/the number of power supply capacitors N.

The load assembly 112 is equivalent to a load capacitor $C_L$ and a load resistor $R_L$ arranged in parallel, and a load inductor L connected in series to the load capacitor $C_L$ and the load resistor $R_L$ arranged in parallel;

when an equivalent capacitance $C_L$ of the load assembly 112 portion is given, minimum capacitance values $C_1$, $C_2$, ... $C_N$ of the power supply capacitors are equal to a DC bus capacitance value $C_{bus}$, which is calculated according to the following formula:

$$C_{bus} = \frac{2I_o}{9\sqrt{3} L_2 \Delta V_o N^3 f_{sw}^3 C_L},$$

where $I_o$ is an output current on an equivalent resistance $R_L$ of the load assembly 112 portion; $V_o$ is an output voltage on the equivalent resistance $R_L$ of the load assembly 112 portion; $\Delta V_o$ is an upper limit value given by an output voltage ripple on the equivalent resistance $R_L$ of the load assembly 112 portion; $f_{sw}$ is a circuit switch frequency; and L is an equivalent inductance of the load assembly 112; and when the equivalent capacitance $C_L$ of the load assembly 112 portion is not limited, the minimum capacitance values $C_1$, $C_2$, ... $C_N$ of the power supply capacitors are equal to the DC bus capacitance value $C_{bus}$, which is calculated according to the following formula:

$$C_{bus} = \sqrt{\frac{2I_o}{9\sqrt{3} L_2 \Delta V_o N^4 f_{sw}^3}},$$

and if $NC_{bus}=C_L$, the required minimum $C_L$ is obtained:

$$C_L = \sqrt{\frac{2I_o}{9\sqrt{3} L_2 \Delta V_o N^2 f_{sw}^3}},$$

where N is the number of power supply capacitors; $I_o$ is an output current on the equivalent resistance $R_L$ of the load assembly 112 portion; $V_o$ is an output voltage on the equivalent resistance $R_L$ of the load assembly 112 portion; $\Delta V_o$ is an upper limit value of the output voltage ripple on the equivalent resistance $R_L$ of the load assembly 112 portion; $f_{sw}$ is a circuit switch frequency; and L is an equivalent inductance of the load assembly 112.

Figure 2A:
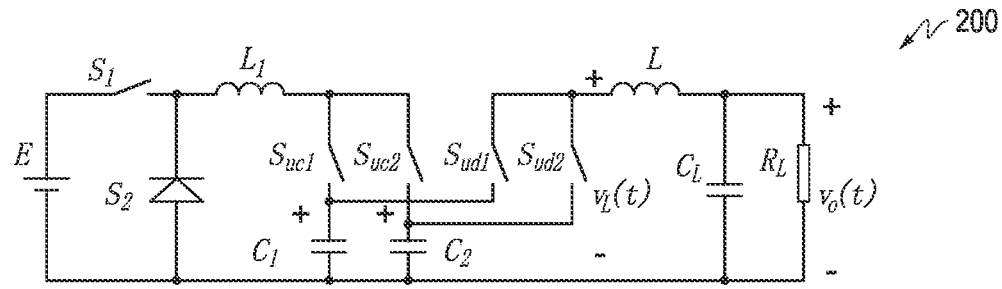
FIGS. 2A-2C are circuit diagrams of a buck converter and a parallel DC capacitor according to Embodiment 2 of the utility model.

Embodiment 2 relates to, as shown in FIG. 2A, a mixed analog-to-digital converter circuit 200, including a power supply E and a digital converter connected to the power supply E, where the digital converter adopts a buck converter; an analog converter is connected between an input end and an output end of the digital converter; and the analog converter is connected to a load assembly, and with reference to FIG. 2A (and similarly, FIGS. 2B and 2C), the load assembly is equivalent to a load capacitor $C_L$ and a load resistor $R_L$ arranged in parallel, and a load inductor L connected in series to the load capacitor $C_L$ and the load resistor $R_L$ arranged in parallel;

the analog converter includes a plurality of power supply capacitors $C_1$, $C_2$, ... $C_N$ arranged in parallel; two ends of each power supply capacitor are respectively connected to the input end and the output end of the digital converter through charge wires, and one of the charge wires is equipped with a charge switch $S_{uc1}$ ... $S_{ucN}$; two ends of each power supply capacitor are respectively connected to an input end and an output end of the load assembly through discharge wires, and one of the discharge wires is equipped with a discharge switch $S_{ud1}$ ... $S_{udN}$; when working, the load assembly is connected to corresponding power supply capacitors in turn by closing the corresponding discharge switch $S_{ud1}$ ... $S_{udN}$; and the power supply capacitors which are not connected to the load assembly are connected to the digital converter in turn by closing the corresponding charge switch. The charge time and discharge time of each power supply capacitor are equal to a circuit switch period $T_{sw}$/the number N of power supply capacitors $C_1$, $C_2$, ... $C_N$.

As noted above, the load assembly is equivalent to a load capacitor $C_L$ and a load resistor $R_L$ arranged in parallel, and a load inductor L connected in series to the load capacitor $C_L$ and the load resistor $R_L$ arranged in parallel.

When an equivalent capacitance $C_L$ of the load assembly portion is given, minimum capacitance values $C_1$, $C_2$, ... $C_N$ of the power supply capacitors are equal to a DC bus capacitance value $C_{bus}$, which is calculated according to the following formula:

$$C_{bus} = \frac{I_o}{36\sqrt{3} \Delta V_o L C_L f_{sw}^3},$$

where $I_o$ is an output current on an equivalent resistance $R_L$ of the load assembly portion; $V_o$ is an output voltage on the equivalent resistance $R_L$ of the load assembly portion; $\Delta V_o$ is an upper limit value given by an output voltage ripple on the equivalent resistance $R_L$ of the load assembly portion; $f_{sw}$ is a circuit switch frequency; and L is an equivalent inductance of the load assembly.

When the arrangement form of this circuit is determined, the specific working principle and the minimum capacitance value required by the power supply capacitor are solved as follows:

(1) In the drawing, $S_{uc1}$ and $S_{uc2}$ are charge switches, and $S_{ud1}$ and $S_{ud2}$ are discharge switches. When $C_1$ is charged, $C_2$ is discharged.

(2) $S_1/S_2$ follows the working principle of a buck converter. When the buck converter works in a discontinuous current mode, a modulation ratio M is equal to:

$$M = \frac{V_{bus}}{E} = \frac{2}{1 + \sqrt{1 + \frac{8L_1 f_{sw}}{R_L D^2}}} \quad (1)$$

where $V_{bus}$ is the voltage across a DC bus capacitor, D is the duty cycle, $R_L$ is the equivalent resistance of the load assembly, E is the power supply voltage, $f_{sw}$ is the switching frequency, and $L_1$ is the inductor of the buck converter.

Figure 3:
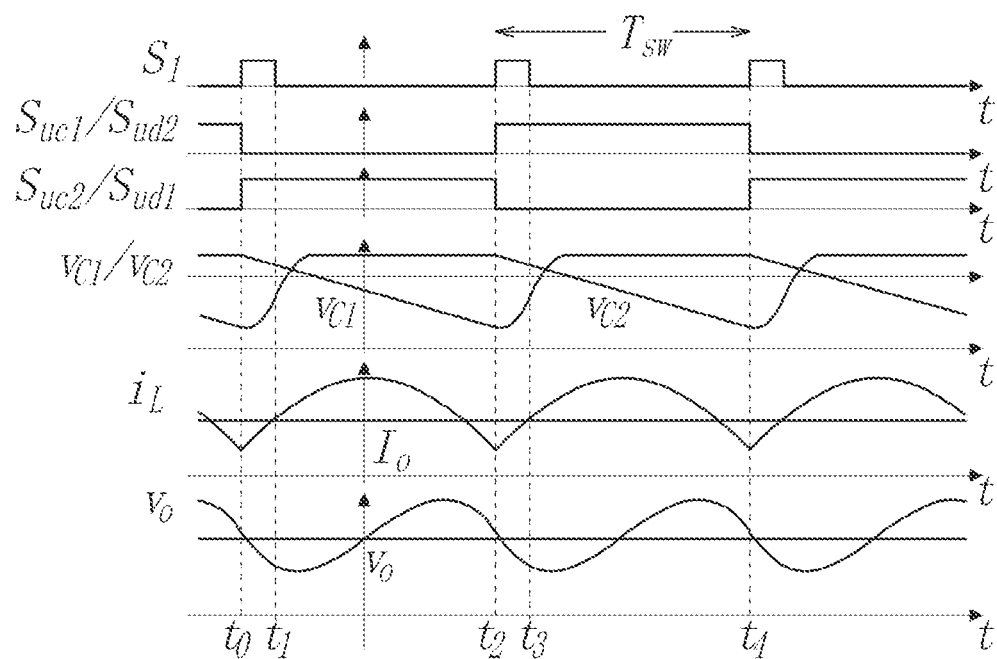
FIG. 3 is a waveform diagram of the buck converter and the parallel DC capacitor according to Embodiment 2 of the utility model.

The duty cycle D is solved according to Formula (1) above, and the on-state of each switch as shown in FIG. 3 is obtained according to the circuit switch periods, where $t_0$ is the start time when $S_1$ is switched on in a first circuit switch period; $t_1$ is the start time when $S_1$ is switched off in the first circuit switch period; $t_2$ is the start time when $S_1$ is switched on in a second circuit switch period, corresponding to $t_0$ in the previous period; and $t_3$ is the start time when $S_1$ is switched off in the second circuit switch period, corresponding to $t_0$ of the previous period.

Figure 2B:
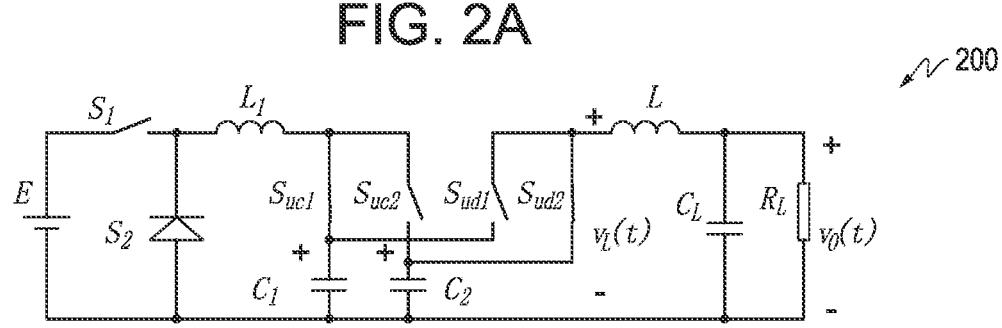

(3) In the time period of $[t_0, t_2]$, $C_1$ is charged and $C_2$ is discharged, and the equivalent circuit is as shown in FIG. 2B.

Figure 2C:
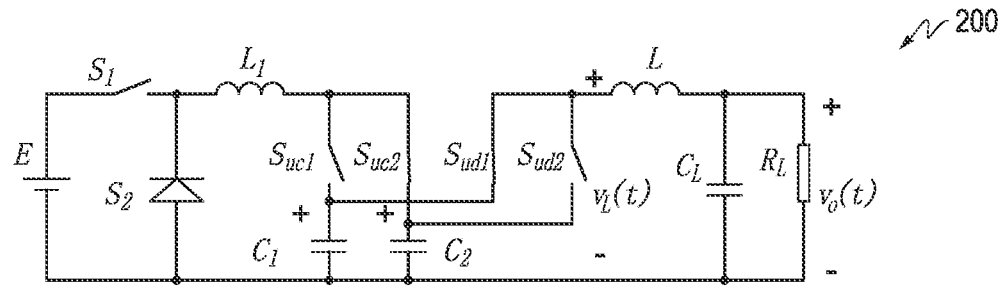

(4) In the time period of $[t_2, t4]$, $C_2$ is charged and $C_1$ is discharged, and the equivalent circuit is as shown in FIG. 2C.

Because the charge loop and the discharge loop are independent, the output voltage ripple depends on the discharge loop. The discharge loop has three energy storage devices ($C_{bus}$, L, $C_L$). According to the spatial state method of network theory, three state equations (2)-(4) can be obtained for general solutions, and three equations (5)-(7) are adopted for identifying the initial state.

$$\begin{cases} C_{bus} dv_{Cbus}(t)/dt = -I_o & (2) \\ L di_L/dt = v_{Cbus}(t) - V_o & (3) \\ C_L dv_{CL}(t)/dt = i_L(t) - I_o & (4) \end{cases}$$

where $L_2$ is the equivalent inductance; $C_L$ is the equivalent capacitance; $C_{bus}$ is an equivalent capacitance on a DC bus; $I_o$ is the output current; $V_o$ is the output voltage; $\Delta V_o$ is the output voltage ripple; $f_{sw}$ is the switching frequency; and L is an equivalent inductance.

$$\begin{cases} \frac{1}{T_{SW}} \int_{-T_{SW}/2}^{T_{SW}/2} v_{Cbus}(t) dt = V_o & (5) \\ \frac{1}{T_{SW}} \int_{-T_{SW}/2}^{T_{SW}/2} i_L(t) dt = I_o & (6) \\ \frac{1}{T_{SW}} \int_{-T_{SW}/2}^{T_{SW}/2} v_{CL}(t) dt = V_o & (7) \end{cases}$$

where $I_o$ is the output current; $V_o$ is the output voltage; $T_{sw}$ is the circuit switch period; and L is the equivalent inductance. The solution of Formulas (2)-(7) is as follows:

$$\begin{cases} v_{Cbus}(t) = -I_o t / C_{bus} + V_o & (8) \\ i_L(t) = -I_o t^2 / (2LC_{bus}) + I_o(1 + T_{sw}^2/(24LC_{bus})) & (9) \\ v_{CL}(t) = -I_o t^3 / (6LC_{bus}C_L) + I_o T_{sw}^2 t / (24LC_{bus}C_L) + V_o(0) & (10) \end{cases}$$

According to the formulas above, the waveform diagrams of $v_{C1}$ and $v_{C2}$, $i_L$ and $v_o$ in FIG. 3 can be obtained. It can be seen from the diagram that $v_{Cbus}$ (the numerical value thereof is equal to $v_{C1}$ and $v_{C2}$) is proportional to (−t), $i_L$ is proportional to (−t²), $V_o$ (the numerical value thereof is equal to $v_{CL}(t)$) is proportional to (−t₃). These conclusions are also verified by Formulas (8)-(10).

In Formula (10), if the maximum value and the minimum value of $$\frac{dv_{CL}(t)}{dt} = 0, v_{CL}(t)$$

are respectively denoted as $V_{CL\_max}$ and $V_{CL\_min}$, and the results thereof are as shown in Formula (11).

$$\begin{cases} V_{CL\_min} = -I_o T_{sw}^3 / (72\sqrt{3} LC_{bus}C_L) + V_o, @t = -T_{SW}/2\sqrt{3} \\ V_{CL\_max} = I_o T_{sw}^3 / (72\sqrt{3} LC_{bus}C_L) + V_o, @t = T_{SW}/2\sqrt{3} \end{cases} \quad (11)$$

According to Formula (11), the ripple voltage of the load of this circuit is obtained, denoted as $\Delta V_{o\_MAD}$, and the result thereof is as shown in Formula (12) and can be verified by subsequent simulation analysis.

$$\Delta V_{o\_MAD} = V_{CL\_max} - V_{CL\_min} = I_o/(36\sqrt{3}LC_{bus}C_L f_{sw}^3) \quad (12)$$

When an upper limit value of the ripple voltage $\Delta V_o$ of the load is given, the minimum capacitance values $C_1, C_2, \ldots C_N$ of the power supply capacitors, i.e. the DC bus capacitance value $C_{bus}$:

$$C_{bus} = \frac{I_o}{36\sqrt{3}\, \Delta V_o L C_L f_{sw}^3},$$

can be calculated according to Formula (12); and the ripple voltage of the discontinuous conduction buck conversion circuit (DCM Buck circuit) is denoted as $\Delta V_{o\_BUCK}$, and the result thereof is as shown in Formula (13).

$$\Delta V_{0\_BUCK} = \frac{V_0}{f_{SW}C_L R_L} + \frac{LEV_0}{2C_L R_L^2(E-V_0)} - \frac{V_0}{C_L}\sqrt{\frac{2LE}{f_{SW}R_L^3(E-V_0)}} \quad (13)$$

It can be found through comparison of Formulas (12) and (13) that the $\Delta V_o$ of the mixed analog-to-digital converter circuit described in the present patent is relatively low. This is because $\Delta V_{o\_MAD}$ is proportional to $1/f_{sw}^3$, and the ripple voltage $\Delta V_{o\_BUCK}$ of the DCM Buck circuit is proportional to $1/f_{sw}$. In addition, the coefficient of Formula (12) is smaller than that of Formula (13).

Figure 4:
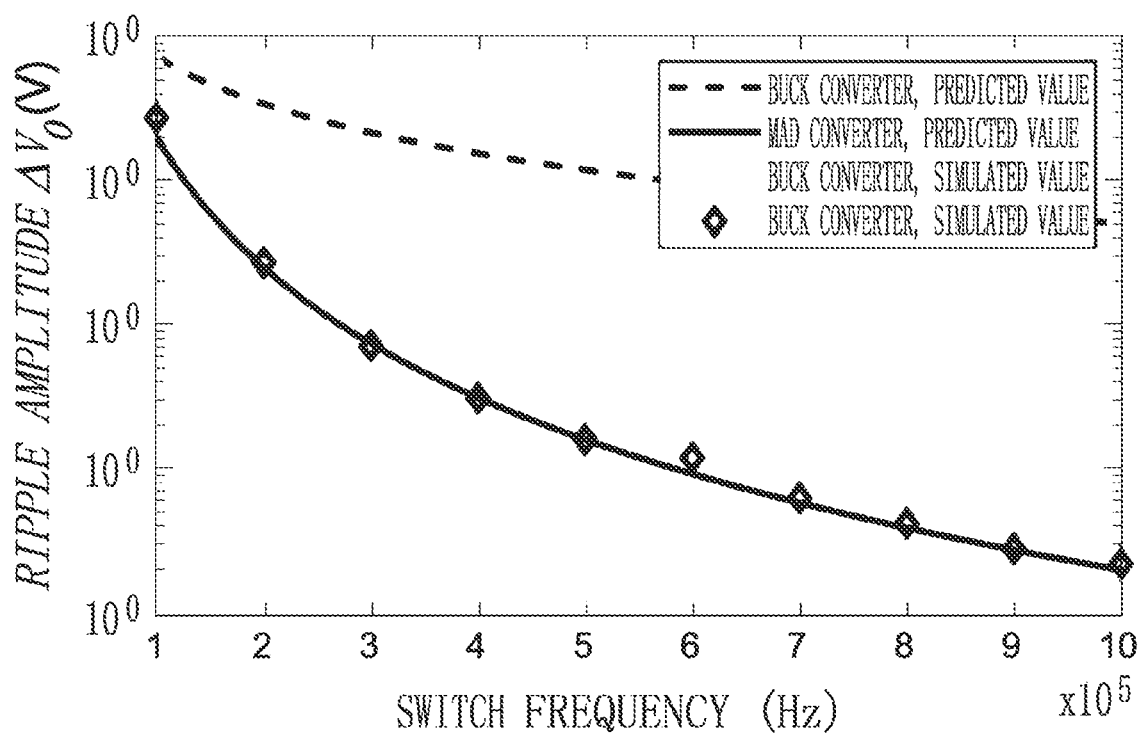
FIG. 4 is a graph obtained from a comparative simulation experiment of output ripple magnitudes of a mixed analogto-digital converter circuit and a discontinuous conduction buck converter circuit according to Embodiment 2 of the utility model.

The diagram obtained from comparison, such as a simulation experiment of the output ripple $\Delta V_o$ magnitudes between the DCM Buck circuit and the mixed analog-to-digital converter circuit in this embodiment is as shown in FIG. 4. The parameters are as follows: P=1000 W, E=400 V, and $V_o$=200 V; $L_1$=$L_2$=1 µH and $C_1$=$C_2$=$C_L$=20 µF in the mixed analog-to-digital converter; and $L_{total}$=2 µH and $C_{total}$=60 µF in the DCM Buck circuit.

Embodiment 3 is basically the same as Embodiment 2, and the difference is that the equivalent capacitance $C_L$ of the load assembly portion is not limited, and the minimum capacitance values $C_1$, $C_2$, ... $C_N$ of the power supply capacitors are equal to the DC bus capacitance value $C_{bus}$, which is calculated according to the following formula:

$$C_{bus} = \sqrt{\frac{I_o}{36\sqrt{3}\, N\Delta V_o L f_{sw}^3}},$$

and if $NC_{bus}$=$C_L$, in this case, the total volume of the capacitors is the smallest, and the required minimum $C_L$ is obtained:

$$C_L = \sqrt{\frac{NI_o}{36\sqrt{3}\, \Delta V_o L f_{sw}^3}},$$

where N is the number of power supply capacitors; $I_o$ is an output current on the equivalent resistance $R_L$ of the load assembly portion; $V_o$ is an output voltage on the equivalent resistance $R_L$ of the load assembly portion; $\Delta V_o$ is an upper limit value of the output voltage ripple on the equivalent resistance $R_L$ of the load assembly portion; $f_{sw}$ is a circuit switch frequency; and L is an equivalent inductance of the load assembly.

Embodiment 4 relates to a mixed analog-to-digital converter circuit, including a power supply and a digital converter connected to the power supply, where an analog converter is connected between an input end and an output end of the digital converter, and the analog converter is connected to a load assembly;

the digital converter includes a component multiplexer connected to an input end and an output end of the power supply E through wires; the component multiplexer includes N power supply capacitors $C_1$, $C_2$, ... $C_N$ which are arranged in series; the analog converter includes the component multiplexer, and two ends of each power supply capacitor in the component multiplexer are respectively connected to an input end and an output end of the load assembly through discharge wires, and at least one of the discharge wires is equipped with a discharge switch; and when working, the load assembly is connected to corresponding power supply capacitors in turn by closing the corresponding discharge switch. The charge time and discharge time of each power supply capacitor are equal to a circuit switch period $T_{sw}$/the number N of power supply capacitors $C_1$, $C_2$, ... $C_N$.

The load assembly is equivalent to a load capacitor $C_L$ and a load resistor $R_L$ arranged in parallel, and a load inductor L connected in series to the load capacitor $C_L$ and the load resistor $R_L$ arranged in parallel.

When an equivalent capacitance $C_L$ of the load assembly portion is given, minimum capacitance values $C_1$, $C_2$, ... $C_N$ of the power supply capacitors are equal to a DC bus capacitance value $C_{bus}$, which is calculated according to the following formula:

$$C_{bus} = \frac{I_o}{36\sqrt{3}\, \Delta V_o L C_L f_{sw}^3},$$

where $I_o$ is an output current on an equivalent resistance $R_L$ of the load assembly portion; $V_o$ is an output voltage on the equivalent resistance $R_L$ of the load assembly portion; $\Delta V_o$ is an output voltage ripple on the equivalent resistance $R_L$ of the load assembly portion; $f_{sw}$ is a circuit switch frequency; and L is an equivalent inductance of the load assembly.

Figure 5:
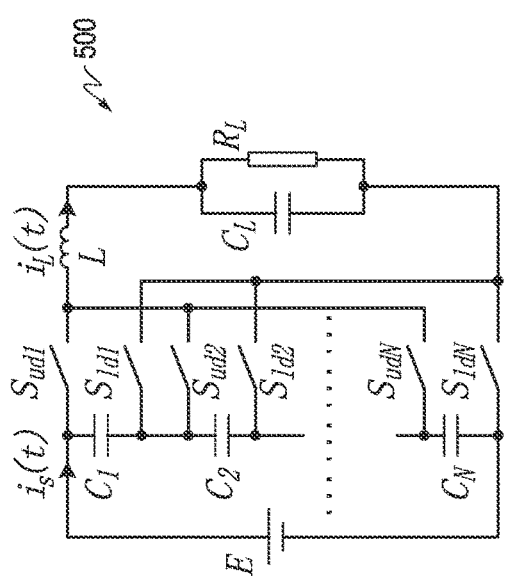
FIG. 5 is a circuit diagram of an N:1 voltage divider and a series capacitor according to Embodiment 4 of the utility model.
Figure 6A:
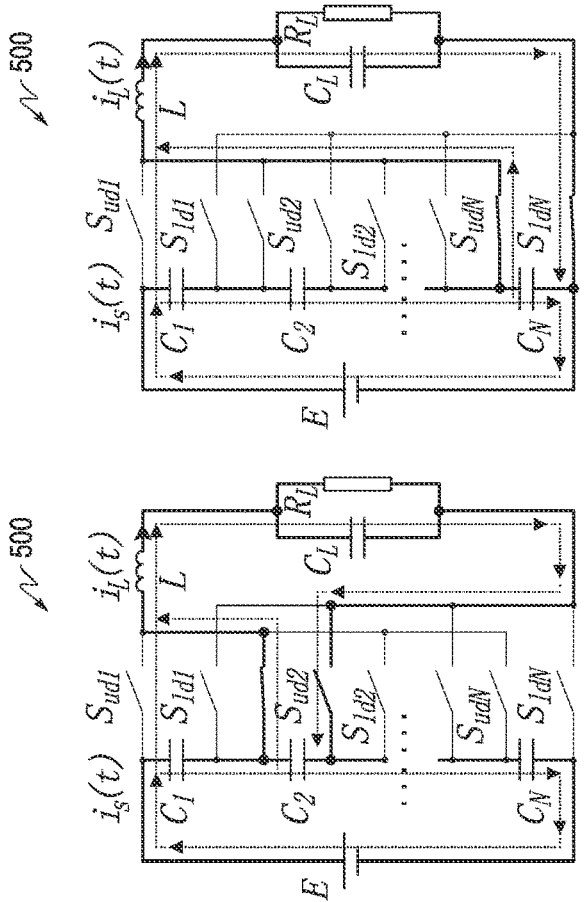
FIGS. 6A-6C are equivalent circuit diagrams of the N:1 voltage divider and the series capacitor according to Embodiment 4 of the utility model.
Figure 6B:
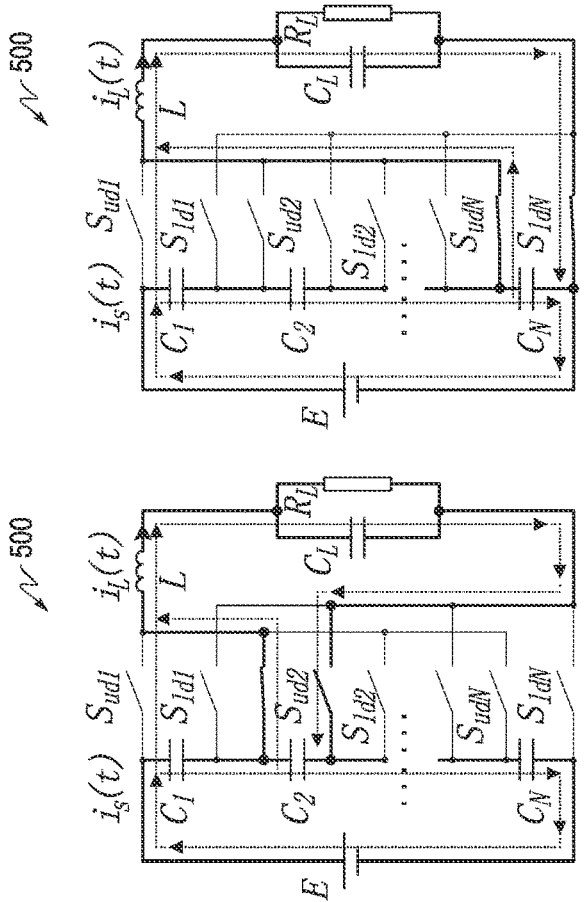
Figure 6C:
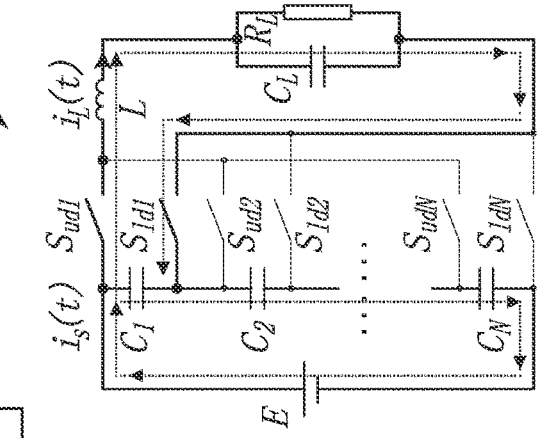
Figure 7:
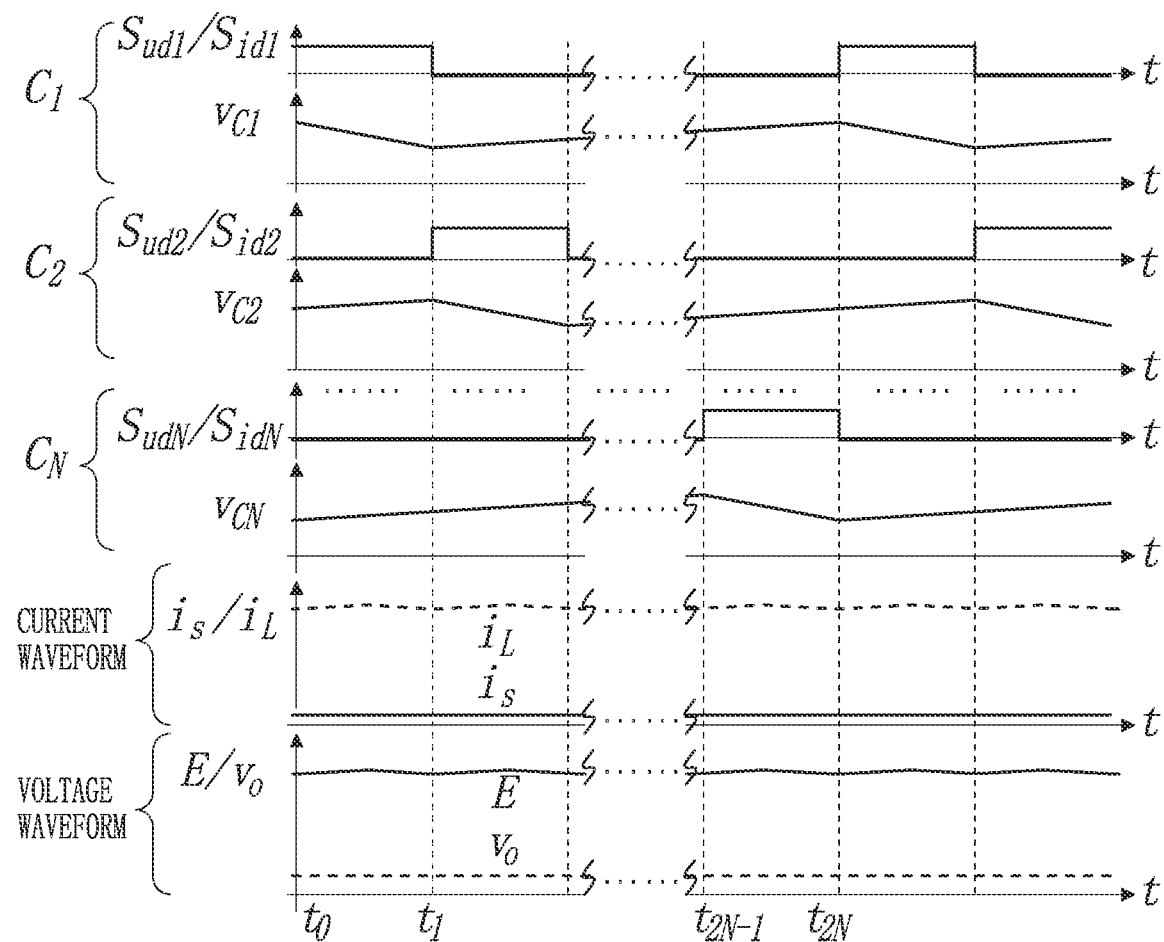
FIG. 7 is a waveform diagram of the N:1 voltage divider and the series capacitor according to Embodiment 4 of the utility model.

The circuit diagram of the mixed analog-to-digital converter circuit 500 is as shown in FIG. 5: capacitors $C_1$-$C_N$ are connected in series to form an N:1 voltage divider, which also serves as a DC bus capacitor. The equivalent circuits at different working stages are as shown in FIGS. 6A-6C, and the waveforms are as shown in FIG. 7.

Similar to the mixed analog-to-digital converter circuit based on the buck converter in Embodiment 2, a modulation index M and $\Delta V_o$ depend on the charge loop and the discharge loop, respectively. For a voltage divider, M=1/N. The main difference between FIG. 3 and FIG. 7 is that the ripple frequency in FIG. 7 is $Nf_{sw}$ and the discharge current of the DC bus capacitor $C_{bus}$ is ($I_o$–$I_s$). Therefore, $\Delta V_o$ in the circuit diagram of the mixed analog-to-digital converter circuit of this embodiment can be derived from Equation (14):

$$\Delta V_0 = \frac{I_0 - I_s}{36\sqrt{3}\, LC_{bus}C_L(Nf_{SW})^3} = \frac{(N-1)I_0}{36\sqrt{3}\, N^4 LC_{bus}C_L f_{SW}^3} \qquad (14)$$

The accuracy of Formula (14) can be verified through simulation analysis. Moreover, the voltage/current from the power supply E, and the voltage and current from the load (for example, E, $i_s(t)$, $v_L(t)$, and $i_L(t)$) have no square waves, as shown in FIG. 7. Therefore, the ripple power is very small, so only a small low-pass filter is required.

Embodiment 5 is basically the same as Embodiment 4, and the difference is that the equivalent capacitance $C_L$ of the load assembly portion is not limited, and the minimum capacitance values $C_1$, $C_2$, ... $C_N$ of the power supply capacitors are equal to the DC bus capacitance value $C_{bus}$, which is calculated according to the following formula:

$$C_{bus} = \sqrt{\frac{I_o}{36\sqrt{3}\, N\Delta V_o L f_{sw}^3}},$$

and if $NC_{bus}$=$C_L$, the total volume of the capacitors is the smallest, and the required minimum $C_L$ is obtained:

$$C_L = \sqrt{\frac{NI_o}{36\sqrt{3}\, \Delta V_o L f_{sw}^3}},$$

where N is the number of power supply capacitors; $I_o$ is an output current on the equivalent resistance $R_L$ of the load assembly portion; $V_o$ is an output voltage on the equivalent resistance $R_L$ of the load assembly portion; $\Delta V_o$ is an output voltage ripple on the equivalent resistance $R_L$ of the load assembly portion; and $f_{sw}$ is a circuit switch frequency.

The embodiments above only illustratively describe the principles and effects of the creation of the present invention, as well as some of the applied embodiments, and are not intended to limit the utility model; and it should be noted that for a person of ordinary skill in the art, several transformations and improvements can be made without departing from the creative idea of the utility model. These transformations and improvements belong to the protection scope of the utility model.

What is claimed is:

1. A mixed analog-to-digital converter circuit, comprising:
    a power supply; and
    a digital converter connected to the power supply, wherein:
    an analog converter is connected between an input end and an output end of the digital converter, and the analog converter is connected to a load assembly;
    the analog converter comprises a plurality of power supply capacitors;
    two ends of each power supply capacitor are respectively connected to the input end and the output end of the digital converter through charge wires, and at least one of the charge wires is equipped with a charge switch;
    two ends of each power supply capacitor are respectively connected to an input end and an output end of the load assembly through discharge wires, and at least one of the discharge wires is equipped with a discharge switch;
    when working, the load assembly is connected to corresponding power supply capacitors in turn by closing the corresponding discharge switch; and
    the power supply capacitors which are not connected to the load assembly are connected to the digital converter in turn by closing the corresponding charge switch.

2. The mixed analog-to-digital converter circuit according to claim 1, wherein:
    the load assembly is equivalent to a load capacitor $C_L$ and a load resistor $R_L$ arranged in parallel, and a load inductor L connected in series to the load capacitor $C_L$ and the load resistor $R_L$ arranged in parallel;
    when an equivalent capacitance $C_L$ of a load assembly portion is given, minimum capacitance values $C_1$, $C_2$, ... $C_N$ of the power supply capacitors are equal to a DC bus capacitance value $C_{bus}$, which is calculated according to the following formula:

$$C_{bus} = \frac{I_o}{36\sqrt{3}\,\Delta V_o L C_L f_{sw}^3},$$

wherein $I_o$ is an output current on an equivalent resistance $R_L$ of the load assembly portion; $V_o$ is an output voltage on the equivalent resistance $R_L$ of the load assembly portion; $\Delta V_o$ is an upper limit value given by an output voltage ripple on the equivalent resistance $R_L$ of the load assembly portion; and $f_{sw}$ is a circuit switch frequency; and when the equivalent capacitance $C_L$ of the load assembly portion is not limited, the minimum capacitance values $C_1, C_2, \ldots C_N$ of the power supply capacitors are equal to the DC bus capacitance value $C_{bus}$, which is calculated according to the following formula:

$$C_{bus} = \sqrt{\frac{I_o}{36\sqrt{3}\,N \Delta V_o L f_{sw}^3}},$$

and if $NC_{bus} = C_L$, the required minimum $C_L$ is obtained:

$$C_L = \sqrt{\frac{N I_o}{36\sqrt{3}\,\Delta V_o L f_{sw}^3}},$$

wherein N is the number of power supply capacitors; $I_o$ is an output current on the equivalent resistance $R_L$ of the load assembly portion; $V_o$ is an output voltage on the equivalent resistance $R_L$ of the load assembly portion; $\Delta V_o$ is an upper limit value given by the output voltage ripple on the equivalent resistance $R_L$ of the load assembly portion; and $f_{sw}$ is a circuit switch frequency.

3. The mixed analog-to-digital converter circuit according to claim 2, wherein the charge time and discharge time of each power supply capacitor are equal to a circuit switch period $T_{sw}$/the number of power supply capacitors N.

4. The mixed analog-to-digital converter circuit according to claim 1, wherein the digital converter is a DC/DC converter.

5. The mixed analog-to-digital converter circuit according to claim 4, wherein the digital converter is a buck converter, or a boost converter, or a resonant converter.

6. The mixed analog-to-digital converter circuit according to claim 5, wherein the charge time and discharge time of each power supply capacitor are equal to a circuit switch period $T_{sw}$/the number of power supply capacitors N.

7. The mixed analog-to-digital converter circuit according to claim 4, wherein the charge time and discharge time of each power supply capacitor are equal to a circuit switch period $T_{sw}$/the number of power supply capacitors N.

8. The mixed analog-to-digital converter circuit according to claim 1, wherein the charge time and discharge time of each power supply capacitor are equal to a circuit switch period $T_{sw}$/the number of power supply capacitors N.

9. A mixed analog-to-digital converter circuit, comprising:
    a power supply; and
    a digital converter connected to the power supply, wherein:
    an analog converter is connected between an input end and an output end of the digital converter, and the analog converter is connected to a load assembly;
    the digital converter comprises a component multiplexer connected to an input end and an output end of the power supply through wires;
    the component multiplexer comprises a plurality of power supply capacitors which are arranged in series;
    the analog converter comprises the component multiplexer, and two ends of each power supply capacitor in the component multiplexer are respectively connected to an input end and an output end of the load assembly through discharge wires, and at least one of the discharge wires is equipped with a discharge switch; and
    when working, the load assembly is connected to corresponding power supply capacitors in turn by closing the corresponding discharge switch.

10. The mixed analog-to-digital converter circuit according to claim 9, wherein:

the load assembly is equivalent to a load capacitor $C_L$ and a load resistor $R_L$ arranged in parallel, and a load inductor L connected in series to the load capacitor $C_L$ and the load resistor $R_L$ arranged in parallel;

when an equivalent capacitance $C_L$ of a load assembly portion is given, minimum capacitance values $C_1$, $C_2$, ... $C_N$ of the power supply capacitors are equal to a DC bus capacitance value $C_{bus}$, which is calculated according to the following formula:

$$C_{bus} = \frac{(N-1)I_o}{36\sqrt{3}\,N^4 C_L L f_{sw}^3},$$

wherein N is the number of power supply capacitors; $I_o$ is the output current; $V_o$ is an output voltage; $\Delta V_o$ is an output voltage ripple; and $f_{sw}$ is a switching frequency; and when the equivalent capacitance $C_L$ of the load assembly portion is not limited, the minimum capacitance values $C_1, C_2, \ldots C_N$ of the power supply capacitors are equal to the DC bus capacitance value $C_{bus}$, which is calculated according to the following formula:

$$C_{bus} = \sqrt{\frac{(N-1)I_o}{36\sqrt{3}\,N^3 L f_{sw}^3}}$$

and if $NC_{bus}=C_L$, the required minimum $C_L$ is obtained:

$$C_L = \sqrt{\frac{(N-1)I_o}{36\sqrt{3}\,N^3 L f_{sw}^3}},$$

wherein N is the number of power supply capacitors; $I_o$ is the output current; $V_o$ is the output voltage; $\Delta V_o$ is the output voltage ripple; and $f_{sw}$ is the switching frequency.

11. The mixed analog-to-digital converter circuit according to claim 10, wherein the charge time and discharge time of each power supply capacitor are equal to a circuit switch period $T_{sw}$/the number of power supply capacitors N.

* * * * *